US010899411B2

United States Patent
Kojika et al.

(10) Patent No.: US 10,899,411 B2
(45) Date of Patent: Jan. 26, 2021

(54) STRADDLE VEHICLE

(71) Applicant: HONDA MOTOR CO., LTD., Tokyo (JP)

(72) Inventors: Ken Kojika, Saitama (JP); Satoru Kamijo, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 230 days.

(21) Appl. No.: 16/069,059

(22) PCT Filed: Feb. 5, 2016

(86) PCT No.: PCT/JP2016/053583
§ 371 (c)(1),
(2) Date: Jul. 10, 2018

(87) PCT Pub. No.: WO2017/134831
PCT Pub. Date: Aug. 10, 2017

(65) Prior Publication Data
US 2019/0031272 A1    Jan. 31, 2019

(51) Int. Cl.
*B62K 19/30*    (2006.01)
*B62H 1/02*    (2006.01)
(Continued)

(52) U.S. Cl.
CPC .............. *B62K 19/30* (2013.01); *B62H 1/02* (2013.01); *B62J 25/00* (2013.01); *B62K 23/08* (2013.01)

(58) Field of Classification Search
CPC .......... B62K 19/30; B62K 23/08; B62H 1/02; B62J 25/00
See application file for complete search history.

(56) References Cited

U.S. PATENT DOCUMENTS 2,285,313 A * 6/1942 Tagliaboschi ............ B62H 1/02
280/303
2,791,441 A * 5/1957 Phillips .................... B62H 1/02
280/302
(Continued)

FOREIGN PATENT DOCUMENTS

CN    202295109 U    7/2012
JP    S58-043580 U    3/1983
(Continued)

OTHER PUBLICATIONS

Apr. 19, 2016, International Search Report issued for related PCT application No. PCT/JP2016/053583.
(Continued)

*Primary Examiner* — Ruth Ilan
*Assistant Examiner* — Conan D Duda
(74) *Attorney, Agent, or Firm* — Paratus Law Group, PLLC

(57) ABSTRACT

A straddle vehicle includes: a body frame including a main frame extending rear-downward from a head pipe, a pivot frame extending downward from the main frame, and a lower frame which extends downward from the head pipe and extends rearward, and further, is connected to a lower portion of the pivot frame; a side stand which supports a vehicle body during parking; and a main step on which a foot of a rider is placed. A side stand bracket for supporting the side stand includes a first fixing portion connected only to the lower portion of the pivot frame and a second fixing portion connected only to a main step bracket for supporting the main step.

8 Claims, 12 Drawing Sheets

(51) Int. Cl.
*B62J 25/00* (2020.01)
*B62K 23/08* (2006.01)

(56) References Cited

U.S. PATENT DOCUMENTS

| | | | |
|---|---|---|---|
| 5,507,200 A | 4/1996 | Reed et al. | |
| 2003/0111823 A1 | 6/2003 | Kuboshima et al. | |
| 2008/0169134 A1* | 7/2008 | Tomolillo | B62K 25/283 180/6.24 |
| 2013/0015634 A1* | 1/2013 | Yasuda | B62K 11/04 280/284 |
| 2013/0055841 A1* | 3/2013 | Nakamura | B62M 25/06 74/473.16 |
| 2016/0375960 A1* | 12/2016 | Imai | B62K 11/04 180/230 |
| 2017/0158279 A1* | 6/2017 | Xie | B62M 7/12 |
| 2020/0070910 A1* | 3/2020 | Noguchi | B62H 1/02 |
| 2020/0070925 A1* | 3/2020 | Usa | B62K 25/20 |

FOREIGN PATENT DOCUMENTS

| | | |
|---|---|---|
| JP | S64-030787 U | 2/1989 |
| JP | 2001-097260 A | 4/2001 |
| TW | 518297 B | 1/2003 |
| TW | M510274 U | 10/2015 |

OTHER PUBLICATIONS

Apr. 19, 2016, International Search Opinion issued for related PCT application No. PCT/JP2016/053583.

Apr. 11, 2018, Taiwanese Office Action issued for related TW application No. 106103702.

Jan. 25, 2019, European Search Report issued for related EP application No. 16889316.2.

* cited by examiner

STRADDLE VEHICLE

CROSS REFERENCE TO PRIOR APPLICATION

This application is a National Stage Patent Application of PCT International Patent Application No. PCT/JP2016/053583 (filed on Feb. 5, 2016) under 35 U.S.C. § 371, which is hereby incorporated by reference in its entirety.

TECHNICAL FIELD

The present invention relates to a straddle vehicle such as a motorcycle.

BACKGROUND ART

In the related art, a side stand for supporting a vehicle body at the time of parking is provided in a straddle vehicle such as a motorcycle. The side stand is attached to a lower portion of a body frame via a side stand bracket. For example, Patent Literature 1 discloses a structure in which the side stand bracket supports an under cowl.

PRIOR ART LITERATURE

Patent Literature

[Patent Literature 1]: JPA 2001-97260

SUMMARY OF THE INVENTION

Problem that the Invention is to Solve

In a straddle vehicle, a main step on which a foot of a rider is placed is attached to a lower portion of a body frame via a main step bracket.

In this case, both a side stand bracket and the main step bracket are attached to a body frame lower portion. However, when the side stand bracket and the main step bracket are brought close to each other, the rigidity is locally extremely increased, and thus there is a concern that the rigidity of the entirety of the body frame is not balanced.

The invention provides a straddle vehicle capable of avoiding a local increase in rigidity of a body frame and appropriately balancing the rigidity of the body frame even in a case of a structure where a side stand bracket and a main step bracket are close to each other so that fastening members are concentrated.

Means for Solving the Problem

The invention provides aspects described below.

According to a first aspect, a straddle vehicle includes a body frame including a main frame extending rear-downward from a head pipe, a pivot frame extending downward from the main frame, and a lower frame which extends downward from the head pipe and extends rearward, and further, is connected to a lower portion of the pivot frame, a side stand which supports a vehicle body during parking, a side stand bracket which supports the side stand, a main step on which a foot of a rider is placed and a main step bracket which supports the main step, wherein the side stand bracket includes:

a first fixing portion connected only to the lower portion of the pivot frame; and a second fixing portion connected only to the main step bracket.

According to a second aspect, in the first aspect, the main step bracket is arranged on an outer side in a vehicle width direction of the side stand bracket and the main step bracket has an opening portion through which a head portion of a first fastening bolt mounted on the first fixing portion passes and is exposed to an outside.

According to a third aspect, in the second aspect, a diameter of a second fastening bolt mounted on the second fixing portions is smaller than that of the first fastening bolt.

According to a fourth aspect, in the second aspect or the third aspect, the main step bracket is arranged so that at least a part of the main step bracket overlaps with the side stand bracket when seen from a side.

According to a fifth aspect, in any one of the second aspect to the fourth aspect, a shift lever for changing a gear ratio of a vehicle by an operation of the rider is supported in the lower frame and a rotation shaft of the shift lever overlaps with the main step bracket when seen from a side.

According to a sixth aspect, in any one of the second aspect to the fifth aspect, the side stand bracket includes a forward extension portion which extends in a forward direction to be closer to the main step than a side stand mounting portion below the lower frame and the pivot frame and the second fixing portion is provided in the forward extension portion, According to a seventh aspect, in any one of the second aspect to the sixth aspect, a recess portion recessed inward in the vehicle wide direction is formed in the lower portion of the pivot frame and the first fixing portion is provided in the recess portion.

According to an eighth aspect, in any one of the second aspect to the seventh aspect, the lower portion of the pivot frame includes a frame fixing portion connected only to the lower frame in a vicinity of the side stand bracket.

According to a ninth aspect, in the seventh aspect, the side stand bracket is attached to the recess portion.

Advantage of the Invention

According to the first aspect, the side stand bracket supporting the side stand includes the first fixing portion connected only to the lower portion of the pivot frame and the second fixing portion connected only to the main step bracket supporting the main step. Therefore, even in the structure where the main step bracket and the side stand bracket are fixed in an overlapped arrangement, the fastening points can be dispersed with respect to the pivot frame. As a result, it is possible to avoid an excessive rigidity increase in the lower portion of the pivot frame and make the rigidity balance of the body frame appropriate.

According to the second aspect, the main step bracket is arranged on the outer side in the vehicle width direction of the side stand bracket and the main step bracket has the opening portion through which the head portion of the first fastening bolt mounted on the first fixing portion passes and is exposed to the outside, and thus only the side stand bracket and the pivot frame can be tightened by the first fastening bolt for mounting the side stand bracket without tightening the main step bracket. Therefore, the rigidity of the fastening portion is dispersed and the rigidity balance of the entirety of the body frame can be made appropriate.

According to the third aspect, since the diameter of the second fastening bolt mounted on the second fixing portions is smaller than that of the first fastening bolt, a fastening force of the second fastening bolt can be made smaller than a fastening force of the first fastening bolt. As a result, it is possible to make the rigidity balance of the entirety of the body frame appropriate by dispersing the fastening portions.

According to the fourth aspect, since the main step bracket is arranged so that at least a part thereof covers the side stand bracket when seen from the side, it is possible to make the side stand bracket invisible from the side, and thus the appearance design is improved.

According to the fifth aspect, since the rotation shaft of the shift lever overlaps with the main step bracket when seen from the side so that the rotation shaft is covered by the main step bracket, the shift lever is inconspicuous. Therefore, it is possible to make it have a neat appearance around the shift lever, and thus the appearance design is improved.

According to the sixth aspect, the side stand bracket includes the forward extension portion which extends in the forward direction to be closer to the main step than the side stand mounting portion below the lower frame and the pivot frame, and the second fixing portion is provided in the forward extension portion. Thus the second fixing portion can be arranged closer to the main step. As a result, support of the main step can be strengthened.

According to the seventh aspect, since, in the lower portion of the pivot frame, the recess portion recessed inward in the vehicle width direction is formed and the first fixing portion is provided in the recess portion, it is possible to avoid a local increase in the rigidity around the first fixing portion, and thus the rigidity balance of the entirety of the body frame can be made appropriate.

According to the eighth aspect, since the lower portion of the pivot frame includes the frame fixing portion connected only to the lower frame in the vicinity of the side stand bracket, the pivot frame and the lower frame can be tightened without tightening both the side stand bracket and the main step bracket together to the frame fixing portion. As a result, it is possible to avoid an excessive rigidity increase in the lower portion of the pivot frame and make the rigidity balance of the body frame appropriate.

According to the ninth aspect, it is possible to reduce the protrusion of the side stand bracket to the outside of the pivot frame.

MODE FOR CARRYING OUT THE INVENTION

Figure 1:
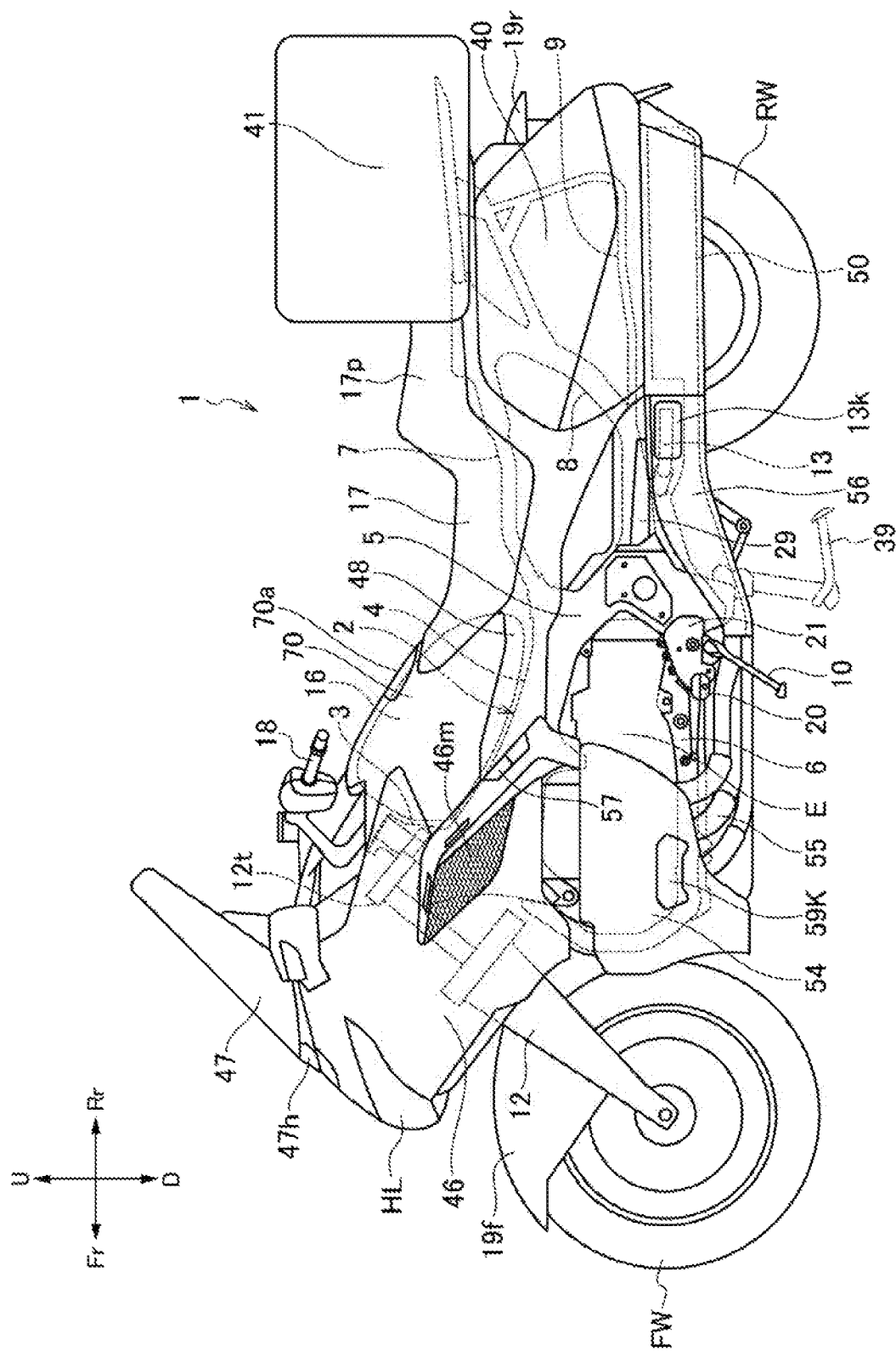
FIG. 1 is a left side view of a motorcycle of an embodiment of a straddle vehicle according to the invention.

Hereinafter, a motorcycle which is an embodiment of a straddle vehicle of the invention will be described with reference to FIGS. 1 to 12. In the following description, the drawings shall be viewed in a direction of reference signs and front and rear, left and right, and up and down are described in accordance with a direction viewed from a rider. Further, in the drawings, the front of the vehicle is indicated by Fr, the rear is Rr, the left is L, the right is R, the upper is U, and the lower is D.

As illustrated in FIG. 1, a body frame 2 as a skeleton portion in a motorcycle 1 includes a pair of right and left main frames 4 extending rearward and downward from a head pipe 3, a pair of pivot frames 5 extending downward from the main frame 4, a pair of lower frames 6 which extends downward from the head pipe 3 and extends rearward, and further, is connected to the lower portion of the pivot frame 5, a pair of seat frames 7 which extends obliquely upper-rearward from the pivot frame 5, a pair of rear lower frames 8 for supporting the seat frame 7 from the lower side, and a bag frame 9 for supporting a saddlebag 40 and the like which will be described below on the rear side of the rear lower frame 8.

The head pipe 3 is attached to a top bridge 12t of a front fork 12 on which a front wheel FW is steerably mounted and a steering handle 18 is mounted on the top bridge 12t. In the body frame 2, a side stand 10 for supporting the vehicle body at the time of parking a vehicle is provided only on the left side of the lower portion of the body frame 2 at a substantially center portion in a front-rear direction of the vehicle and a main stand 39 is installed further on the rear side than the side stand 10. Also, just in front of the side stand 10, a main step 20 on which a rider's foot is installed so as to protrude to both the right and left sides and a pillion step 29 for placing a foot of an additional rider is installed obliquely upper-rearward of the main step 20 so as to protrude to both the right and left sides (see FIG. 2).

A fuel tank 16 is arranged between the main frames 4. Further, on the rear upper side of the fuel tank 16, a riding seat 17 on which a driver sits and a passenger seat 17p on which an additional rider sits are supported by the seat frame 7 so as to have steps in the front-rear direction. Also, a trunk box 41 is provided behind the passenger seat 17p.

An engine E is mounted in a space surrounded by the main frame 4, the pivot frame 5, and the lower frame 6. An exhaust pipe 55 extending obliquely rear-downward from the engine E further extends backward and is connected to a muffler 50. Further, a rear wheel RW is appropriately supported by the body frame 2 via a swing arm, a cushion unit, and the like (not illustrated). The saddlebag 40 is provided on the right and left sides of the rear wheel RW and the mufflers 50 are provided on the lower side of the saddlebag 40 so as to pinch the rear wheel RW.

Figure 2:
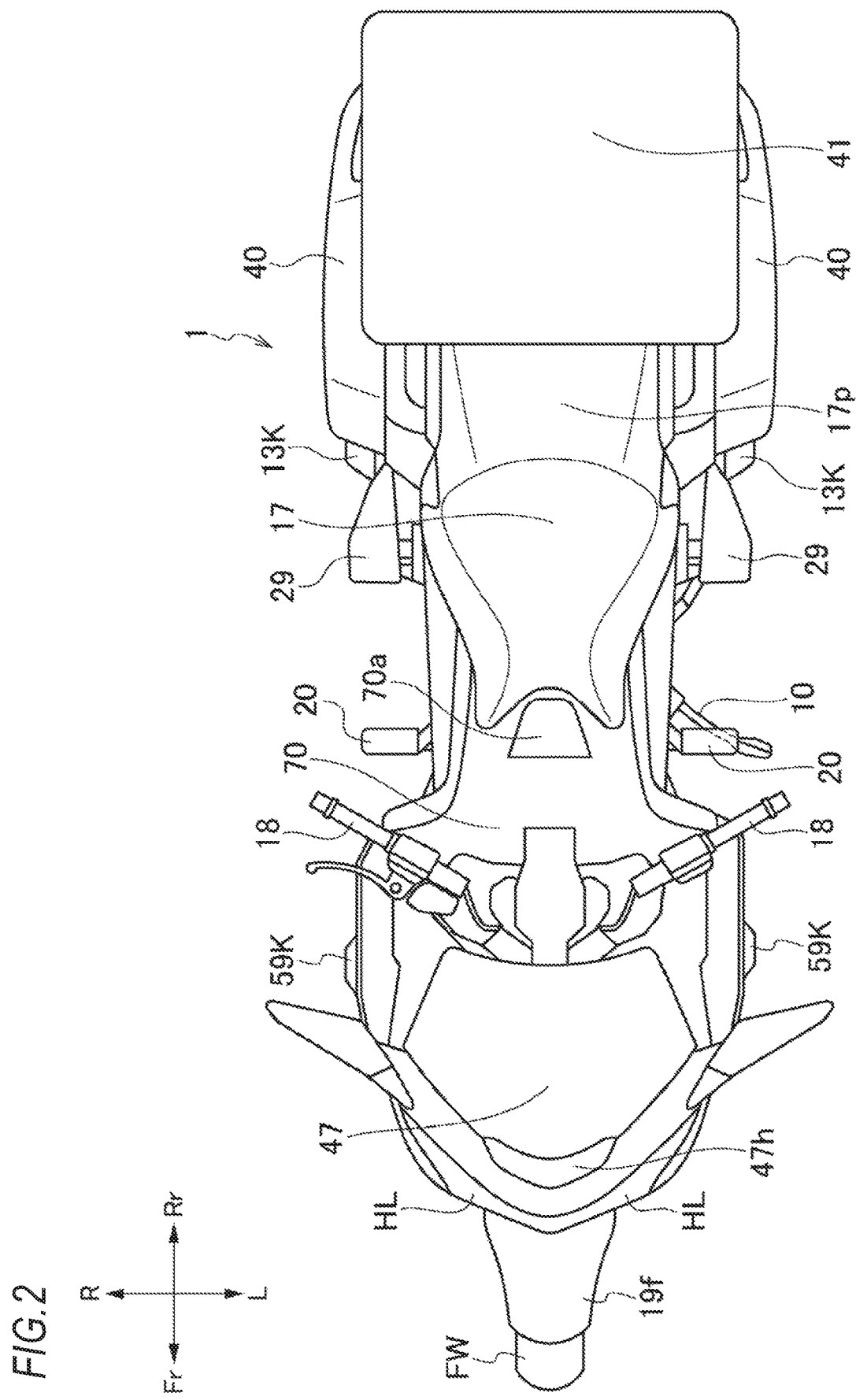
FIG. 2 is a plan view of the motorcycle illustrated in FIG. 1 as viewed from above.
Figure 3:
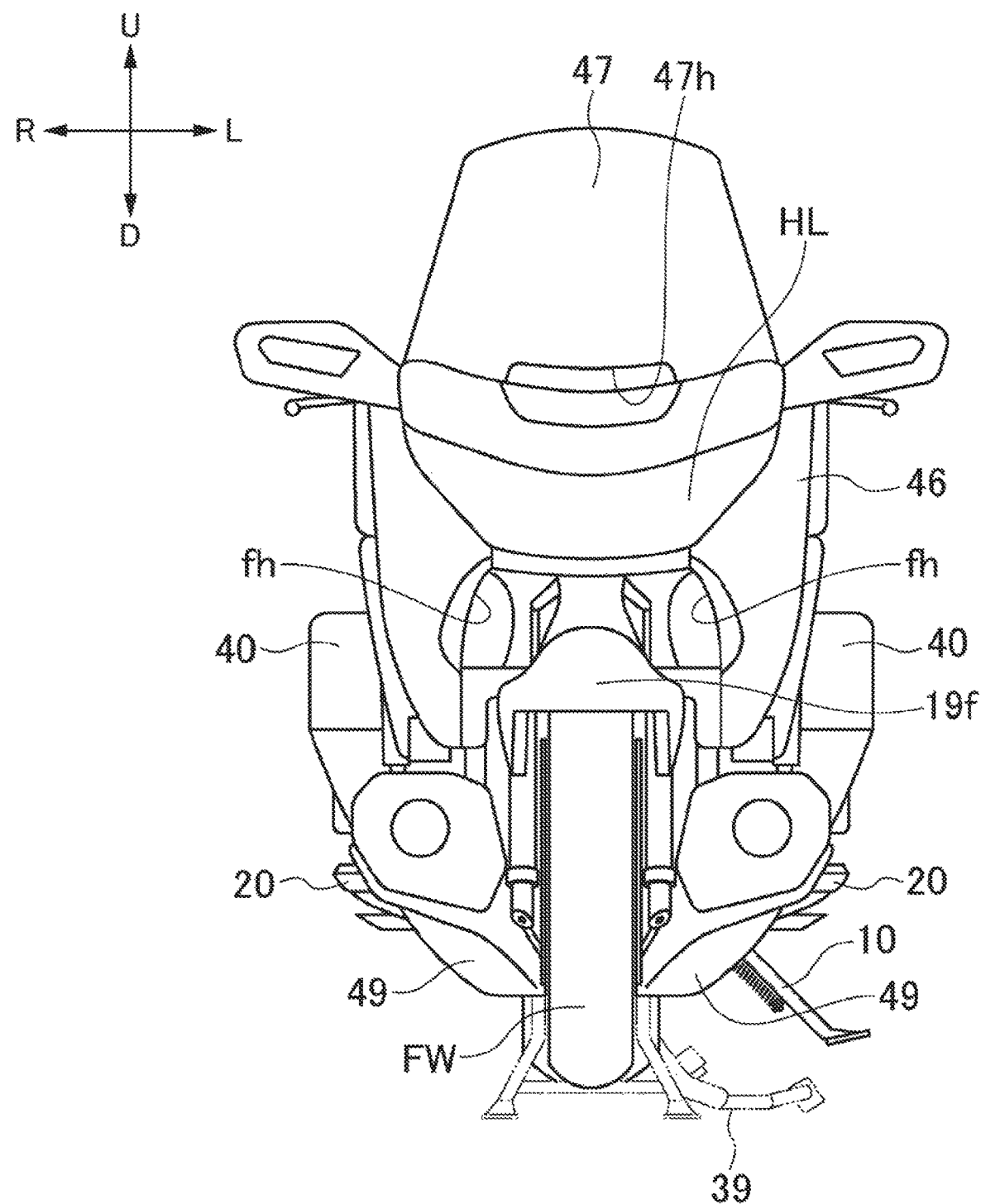
FIG. 3 is a front view of the motorcycle illustrated in FIG. 1 as viewed from the front.

The outer surface of a vehicle is appropriately covered by a cover member. With reference also to FIGS. 2 and 3, a headlight HL is provided at the center of the front portion of the vehicle and a front cowl 46 is provided so as to cover the upper, lower, left, and right sides of the headlight HL. A front screen 47 is provided above the front cowl 46.

A side cover 48 is provided behind the front cowl 46 so as to cover the main frame 4 and the lower side of the fuel tank 16, and a top cover 70 is provided so as to cover the fuel tank 16. Further, a head cover 54, an engine guard cover 59*k*, and the like for covering the side surface of the engine F and the like are provided below the front cowl 46.

A rear portion of the exhaust pipe 55 and the muffler 50 are covered by an exhaust pipe cover 56 and the exhaust pipe cover 56 is provided with a guard body cover 13*k* covering a guard body 13 protruding from an opening portion. Further, the front wheel FW is covered by a front fender 19*f* and the rear wheel RW is covered by a rear fender 19*r*. In FIG. 1, the reference numeral 57 denotes a parking lever and the reference numeral 70*a* denotes a fuel lid.

The side stand 10 is attached to the left side of the lower portion of the body frame 2 via a side stand bracket 11. In addition, the main step 20 protrudes to both the right and left sides in a vehicle width direction as described above and is provided at a position close to the side stand 10. In this case, the main step bracket 21 to which the main step 20 is attached and the side stand bracket 11 are arranged so as to overlap with each other when seen from the side. That is, the main step bracket 21 is provided so as to cover the side stand bracket 11.

Hereinafter, with reference to FIGS. 4 to 8, shapes and attachment structures of the side stand 10 and the main step 20 will be described in detail.

Figure 4:
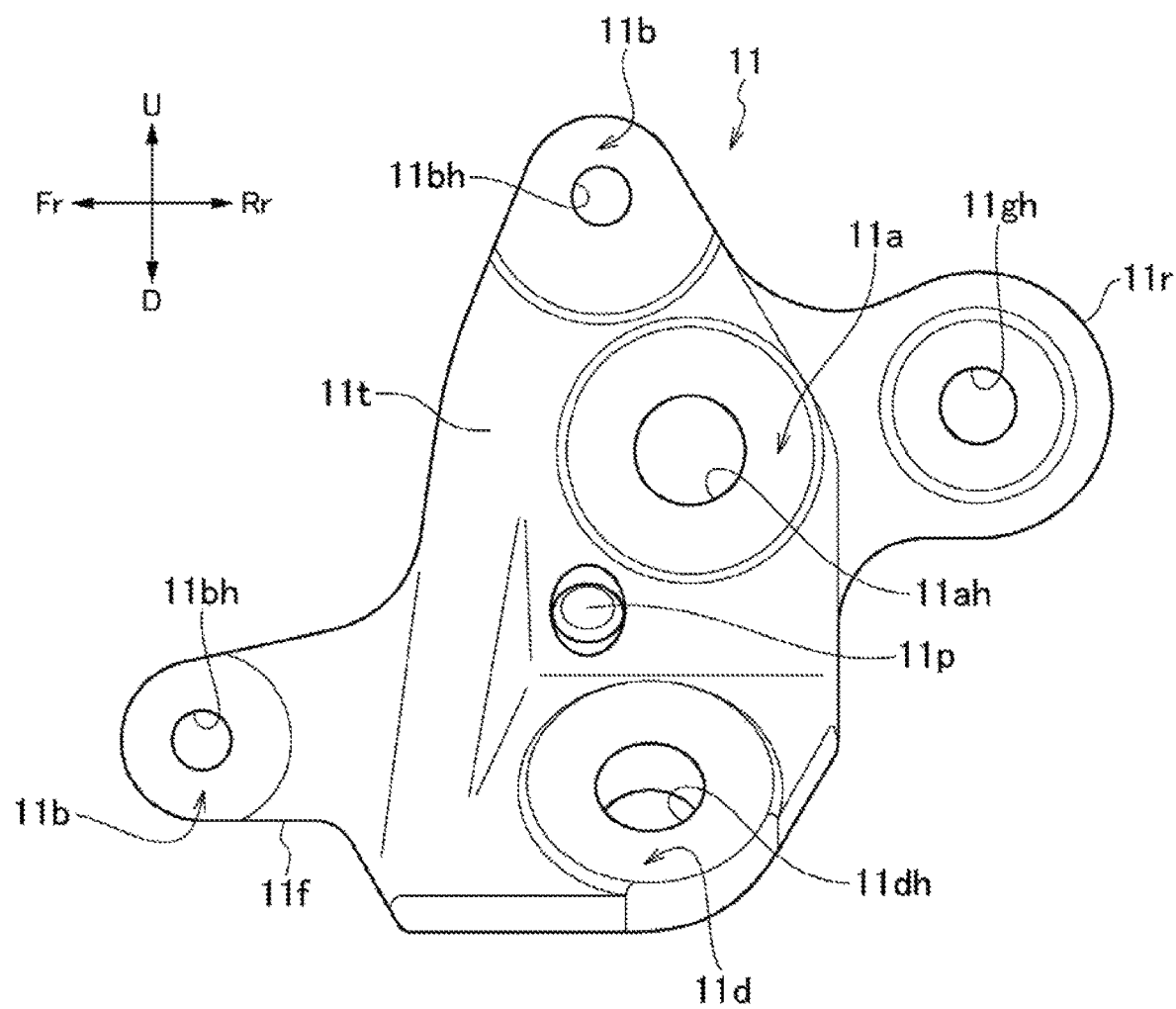
FIG. 4 is a side view of a side stand bracket as viewed from the left side.

The side stand bracket 11 is made of, for example, a metal plate formed by forging. As illustrated in FIG. 4, when seen from the side, a forward extension portion 11*f* extending toward the front side is provided at the lower end portion of a base portion 11*t* having a substantially triangular shape and a rearward extension portion 11*r* extending rearward is provided at the substantially center portion of the base portion 11*t*. At the lower end portion of the base portion 11*t*, a side stand mounting portion 11*d* including a mounting hole 11*dh* for rotatably holding the side stand 10 is provided toward the lower end side in a state where the side stand mounting portion 11*d* is inclined toward the vehicle outer side such that supporting can be performed at a desired inclination angle when the side stand 10 stands up. That is, the forward extension portion 11*f* extends further on the front side than the side stand mounting portion 11*d* from the lower end portion of the base portion 11*t*. A first fixing portion 11*a* including a first fixing hole 11*ah* is provided in the substantially center of the base portion 11*t* and a locking hole 11*gh* is formed in the rearward extension portion 11*r*. Further, second fixing portions 11*b* including second fixing holes 11*bh* are respectively provided in the upper end portion of the base portion 11*t* and the forward extension portion 11*f*. Although it will be described below in detail, the first fixing portion 11*a* is connected only to the pivot frame 5 and the second fixing portion 11*b* is connected only to the main step bracket 21. In the base portion 11*t*, a pin member 11*p* protruding inward of the vehicle (see FIG. 5) is provided below the first fixing portion 11*a*.

Figure 5:
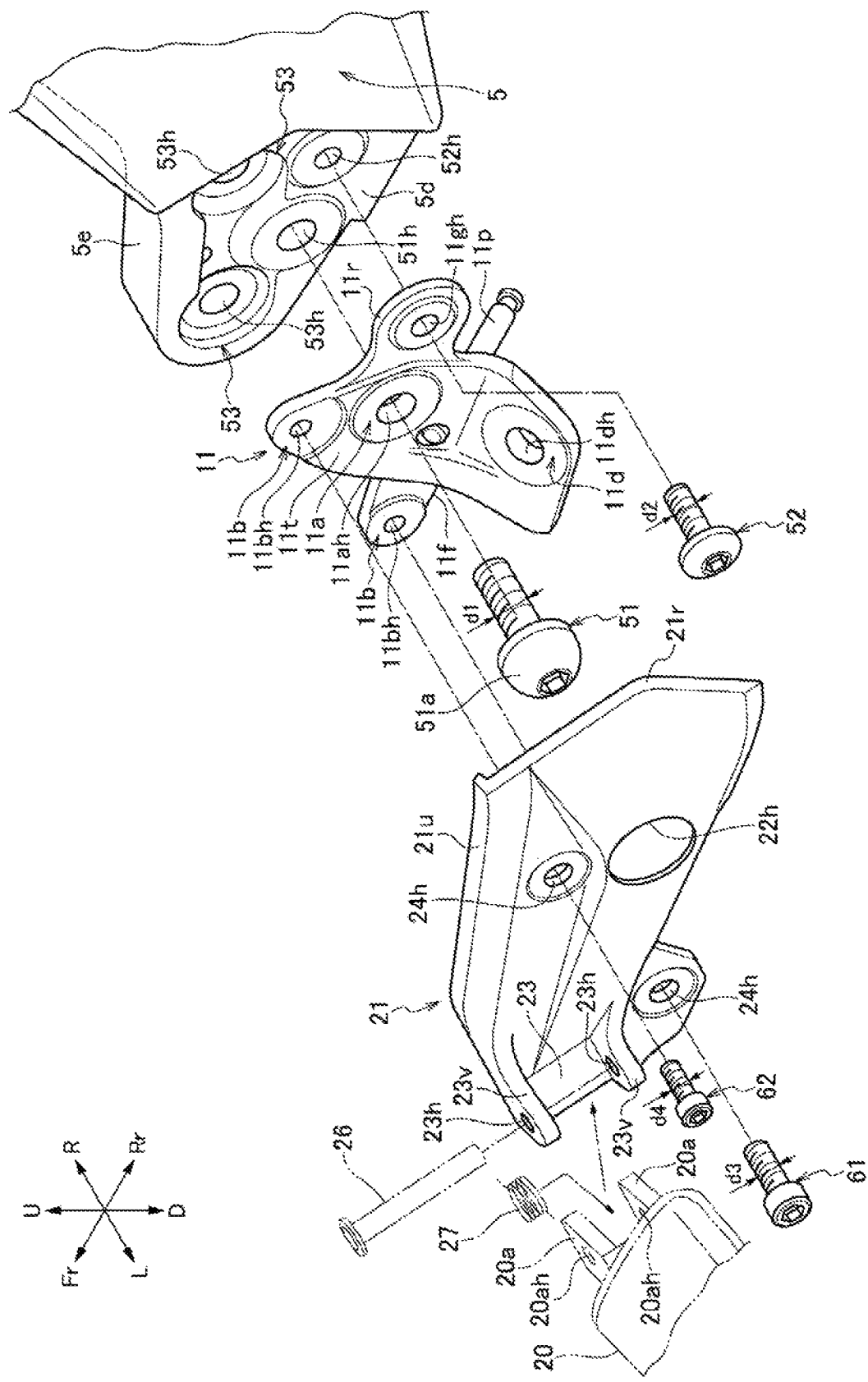
FIG. 5 is an exploded perspective view of a mounting portion of a main step bracket and a side stand bracket.

The main step bracket 21 is made of, for example, a metal plate formed by casting and, as illustrated in FIG. 5, an upper opening portion 22*h* having a circular shape is provided slightly rearward from the center portion thereof. Two second fixing holes 24*h* corresponding to the second fixing portions 11*b* of the side stand bracket 11 are provided on the upper side and the front-lower side of the opening portion 22*h*. In the main step bracket 21, a step mounting portion 23 on which the main step 20 is mounted is provided at the forefront portion thereof. The step mounting portion 23 includes attachment ribs 23*v* protruding in parallel at predetermined intervals obliquely up and down and through holes 23*h* through which a penetration pin 26 passes are formed in the attachment ribs 23*v*. The main step 20 is pivotally mounted by the penetration pin 26 which passes through base portion holes 20*ah* of step mounting base portions 20*a* and the through hole 23*h*. Further, the main steps 20 are urged in a direction (direction in which the main steps 20 protrude to the right and left outside of the vehicle) in which the main steps 20 are opened by a spring 27 which is penetrated by the penetration pin 26 and mounted between the step mounting base portions 20*a*. In the main step bracket 21, an upper end portion 21*u* on the upper side is bent inward of the vehicle, and further a front end portion 21*f* (see FIG. 8) on the front side and a rear end portion 21*r* on the rear side are also slightly bent inward of the vehicle. The main step bracket 21 is formed by casting so that a painted surface is homogeneous as compared with a case where the main step bracket 21 is formed by forging.

As illustrated in FIG. 5, a recess portion 5*d* recessed inward in the vehicle width direction is formed in a lower portion 5*e* of the pivot frame 5 to which the side stand bracket 11 is attached. In the recess portion 5*d*, a screw hole 51*h* for the first fixing portion is formed at a position corresponding to the first fixing portion 11*a* of the side stand bracket 11 and a locking screw hole 52*h* is formed at a position corresponding to the locking hole 11*gh*. In the lower portion 5*e* of the pivot frame 5 on the right side of the vehicle, the screw hole 51*h* for the first fixing portion and the locking screw hole 52*h* are not formed.

Figure 8:
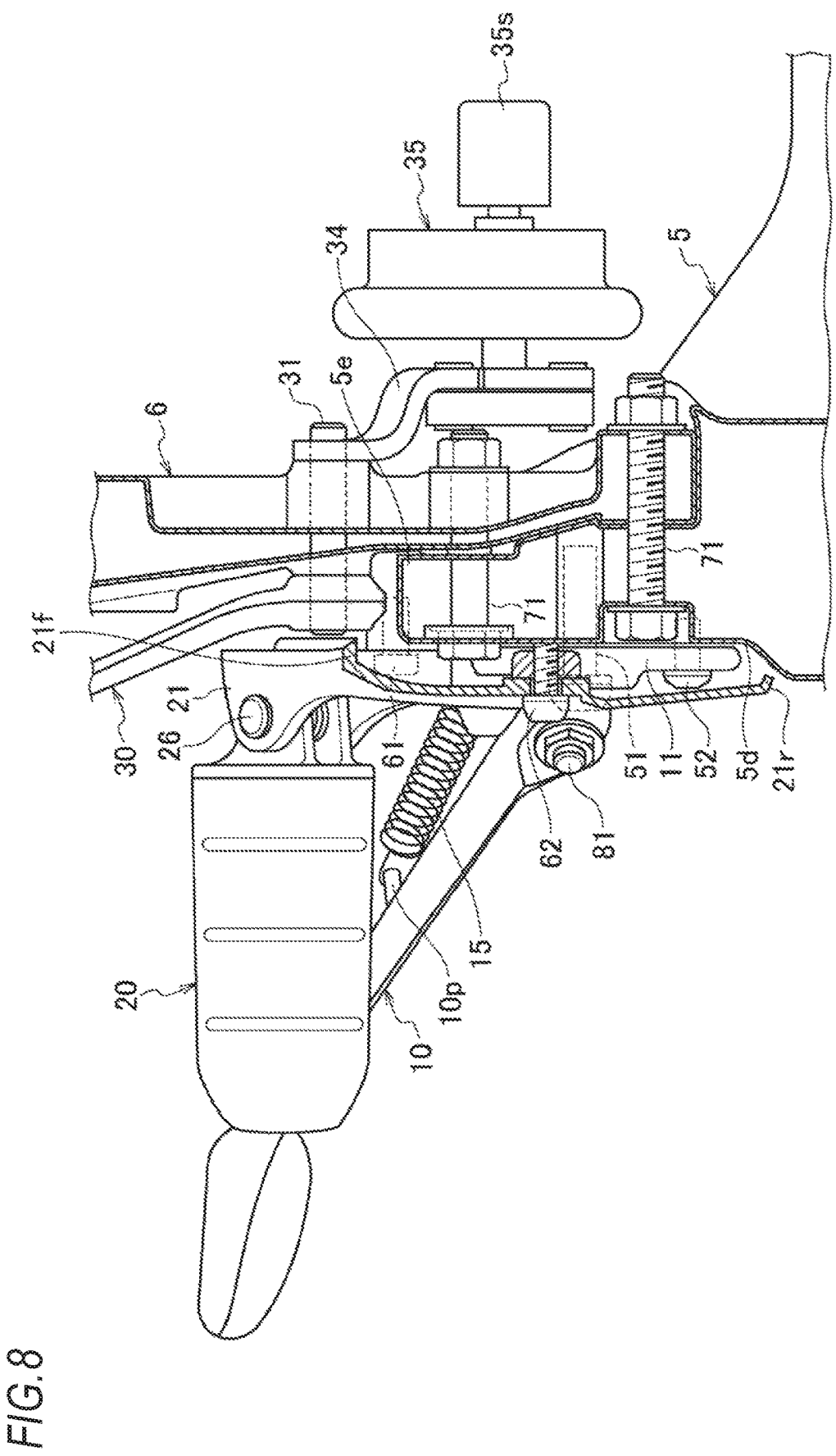
FIG. 8 is a cross-sectional view taken along a line A-A in FIG. 7.

Further, in the lower portion 5*e* of the pivot frame 5, two frame fixing portions 53 including frame through holes 53*h* are provided in the vicinity of the screw hole 51*h* for the first fixing portion and the locking screw hole 52*h*. With reference also to FIG. 8, the pivot frame 5 is connected to the lower frame 6 by frame fastening bolts 71 which pass through the frame through holes 53*h*. That is, the frame fixing portion 53 of the pivot frame 5 is fastened only to the lower frame 6, so that it is avoided that the side stand bracket 11 or the main step bracket 21 are tightened together.

In the side stand bracket 11, a first fastening bolt 51 penetrating the first fixing hole 11*ab* of the first fixing portion 11*a* is screwed into the screw hole 51*h* for the first fixing portion of the lower portion 5*e* of the pivot frame 5, and thus the side stand bracket 11 is fastened only to the pivot frame 5. Further, the locking bolt 52 penetrating the locking hole 11*gh* is screwed into the locking screw hole 52*h* of the lower portion 5*c* of the pivot frame 5, and thus the side stand bracket 11 is locked so as not to rotate with respect to the pivot frame 5. The locking bolt 52 has a function only to prevent the rotation of the side stand bracket 11, and thus the locking bolt 52 may be a bolt with a smaller diameter than that of the first fastening bolt 51. That is, a thread diameter d2 of the locking bolt 52 is smaller than a thread diameter d1 of the first fastening bolt 51 (d2<d1).

The side stand bracket 11 has a structure in which second fastening bolts 61, 62 are passed through second fixing holes 24*h* from the outside of the vehicle and are engaged with female screws formed in the second fixing holes 11*bh* to be fastened in a state where the two second fixing holes 24*h* of the main step bracket 21 face the second fixing holes 11*hh* of the two second fixing portions 11*b* from the outside of the vehicle. In this manner, the side stand bracket 11 is connected only to the pivot frame 5 in the first fixing portion 11*a* and only to the main step bracket 21 in the second fixing portion 11*b*.

Further, a thread diameter d3 of the second fastening bolt 61 mounted on the second fixing portion 11*b* and a thread diameter d4 of the second fastening bolt 62 are smaller than the thread diameter d1 of the first fastening bolt 51 (d3<d1 and d4<d1).

Figure 6:
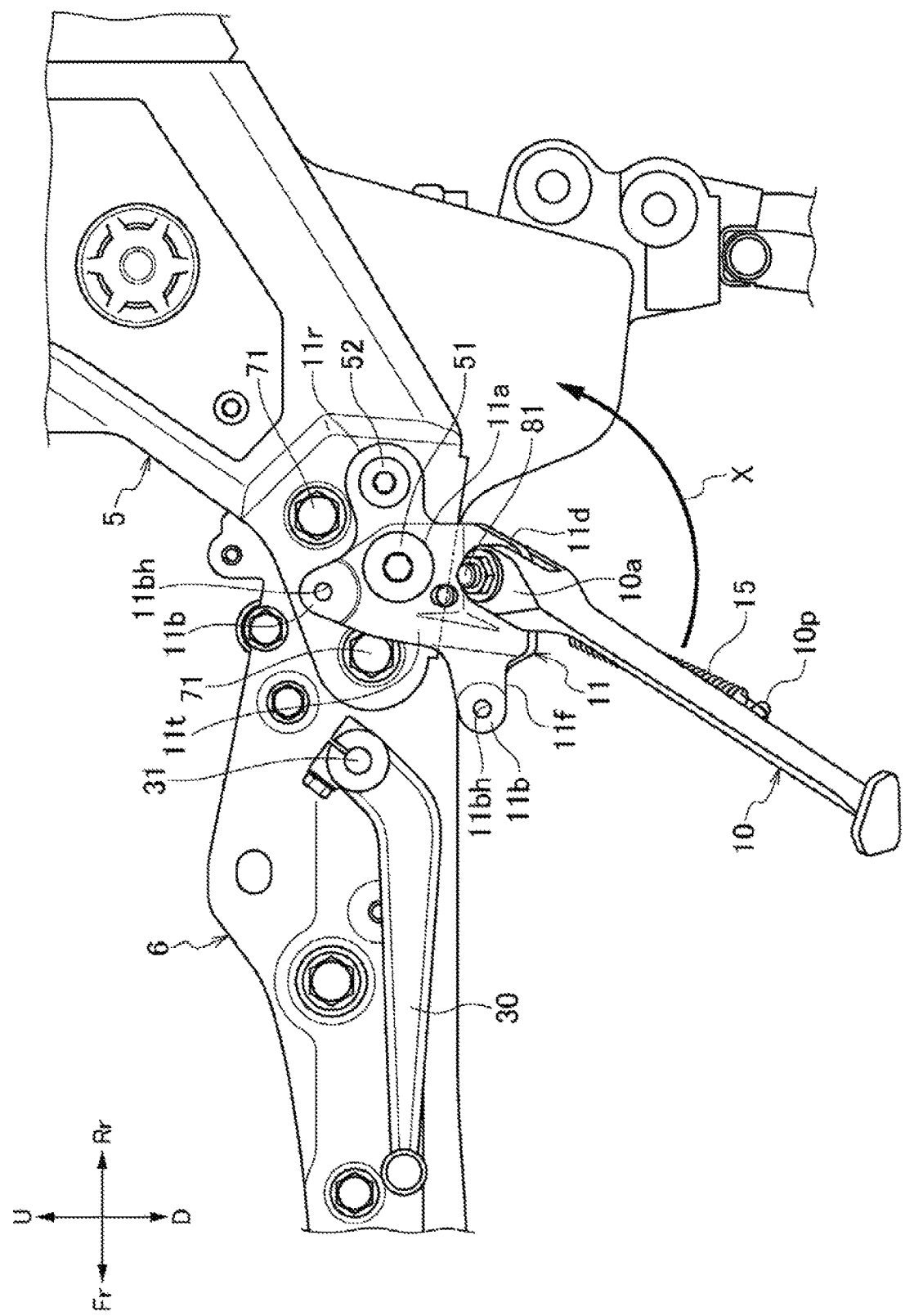
FIG. 6 is an enlarged side view illustrating a state where the side stand bracket is attached.

As illustrated in FIG. 6, the side stand mounting portion 11*d* and the forward extension portion 11*f* of the side stand bracket 11 do not overlap with the lower frame 6 and the pivot frame 5 when seen from the side view and are positioned lower than the lower frame 6 and the pivot frame 5.

Figure 7:
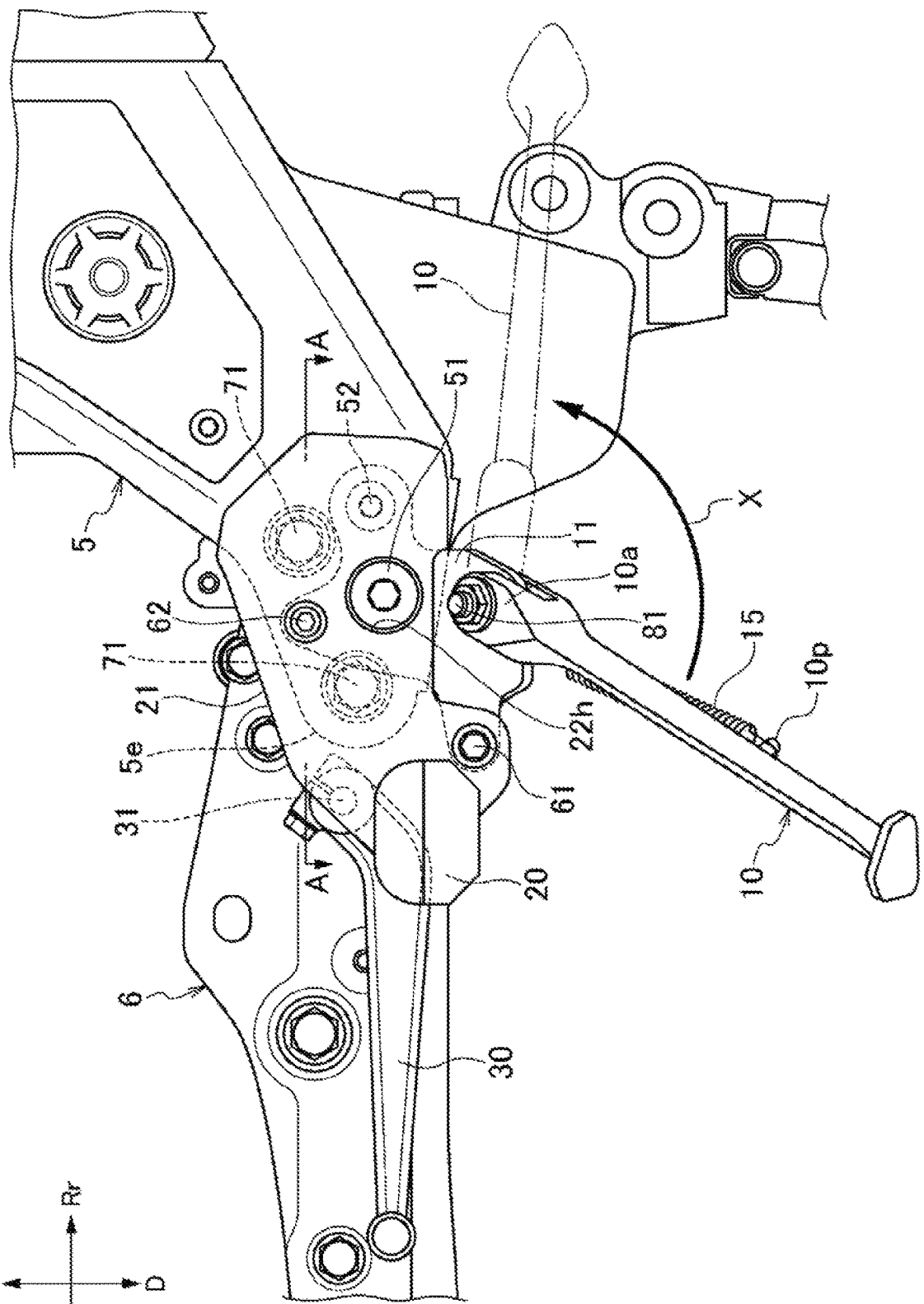
FIG. 7 is an enlarged side view illustrating a state where the main step bracket and the side stand bracket are attached.

As illustrated in FIGS. 6 and 7, the side stand 10 is pivotably mounted on the mounting hole 11*dh* of the side stand mounting portion 11*d* as a mounting bolt 81 passes through a rotating base portion 10*a*, and thus the side stand 10 can take a standing state (a state indicated by a solid line in FIG. 7) at the time of parking and a stored state (a state indicated by a two-dot chain line in FIG. 7) at the time of traveling. On the side stand 10, a spring locking pin 10*p* (see FIG. 8) extended inward of the vehicle is provided in the middle of the longitudinal direction. Further, a spring 15 is suspended across the spring locking pin 10*p* and the pin member 11*p* (see FIG. 5) provided on the side stand bracket 11, and thus the side stand 10 is urged in a direction (direction of an arrow X in FIGS. 6 and 7) returning from the standing state to the stored state.

As illustrated in FIG. 7, the main step bracket 21 is attached to the outside in the vehicle width direction of the side stand bracket 11 so as to substantially cover the side surface of the side stand bracket 11 except for the side stand mounting portion 11*d*, A head portion 51*a* of the first fastening bolt 51 mounted on the first fixing portion 11*a* passes through the opening portion 22*h* formed in the main step bracket 21 so as to be exposed to the outside. That is, the first fastening bolt 51 does not contribute anything to fastening to the main step bracket 21.

An upper end edge and front and rear end edges of the side stand bracket 11 are also covered by the upper end portion 21*u*, the front end portion 21*f*, and the rear end portion 21*r* of the main step bracket 21 (see FIG. 8).

As illustrated in FIG. 8, in the lower frame 6, a shift lever 30 for changing a gear ratio of the vehicle by the operation of a rider is supported at a position close to the main step 20. A rotation shaft 31 of the shift lever 30 penetrates the lower frame 6, is connected to a link member 34 provided further on the inner side in the vehicle width direction than the lower frame 6, and is connected to a shift mechanism 35 via the link member 34. A shift sensor 35*s* is attached to the shift mechanism 35 so as to be able to detect the position of the gear shift.

As illustrated in FIG. 7, the rotation shaft 31 of the shift lever 30 is disposed to be overlapped with the main step bracket 21 when seen from the side, that is, inside the main step bracket 21, and the rotation shaft 31 cannot be seen from the side.

Figure 9:
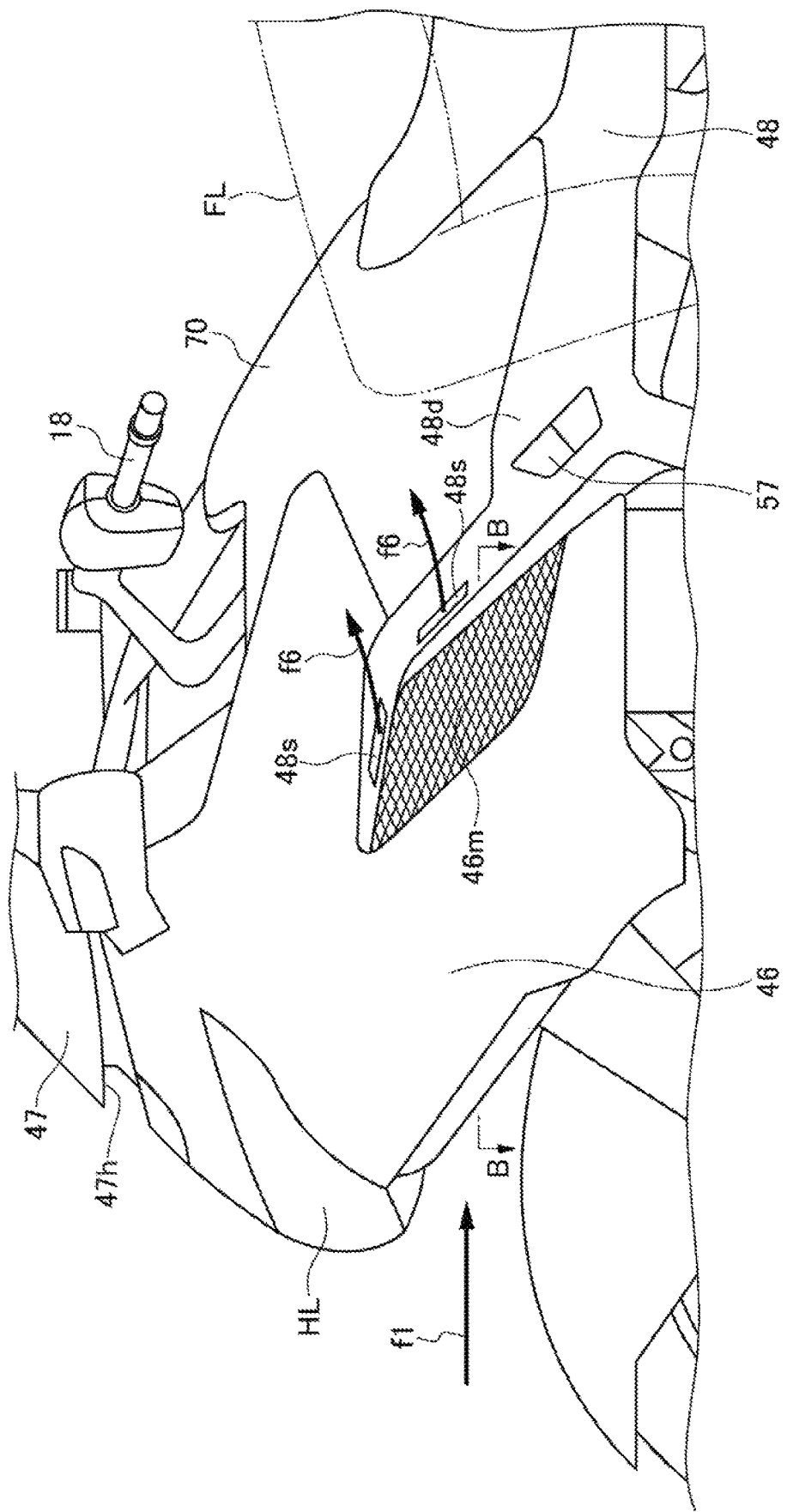
FIG. 9 is a perspective view of a left side of a front cowl in the straddle vehicle illustrated in FIG. 1 as viewed obliquely from above.
Figure 10:
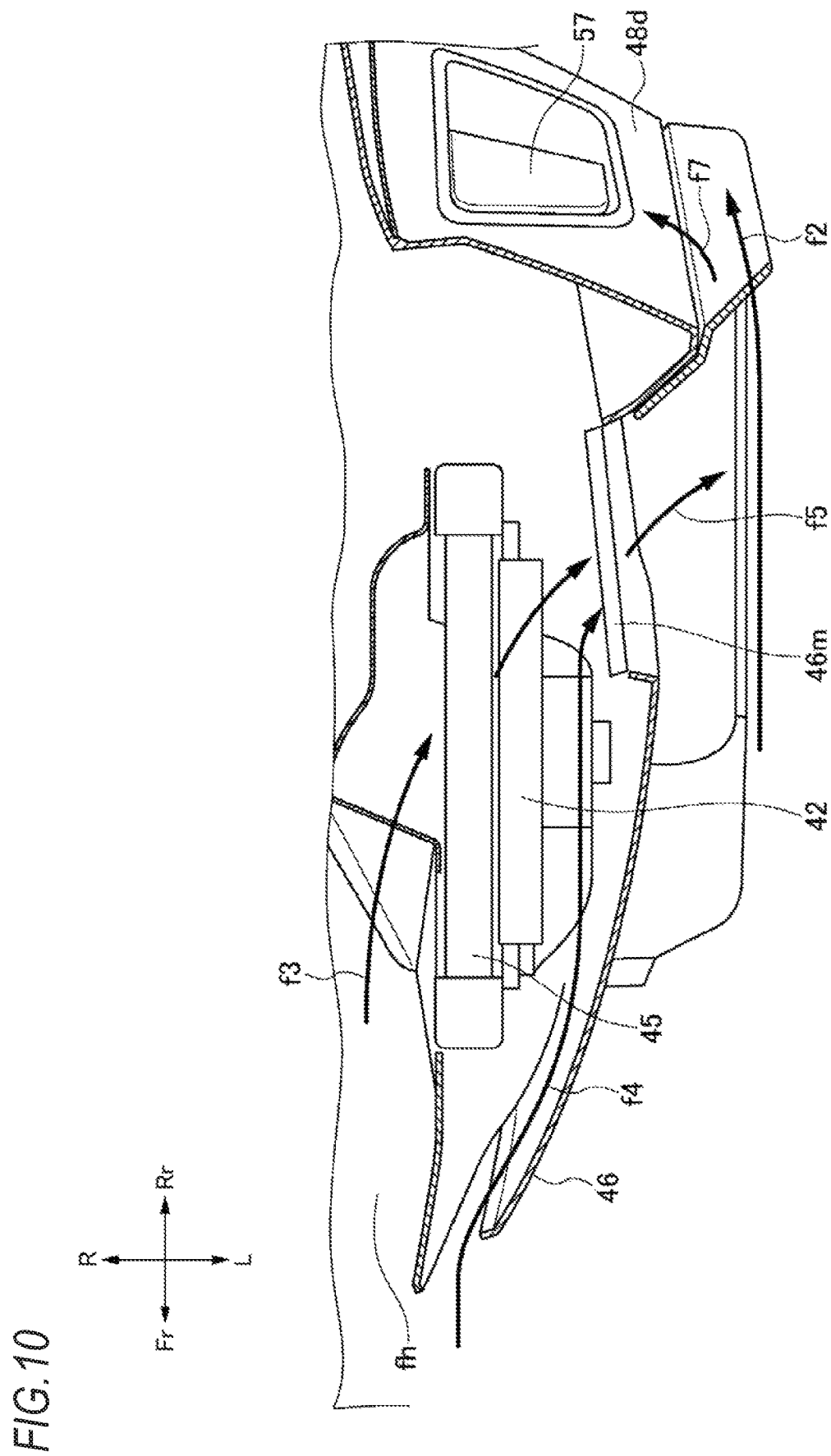
FIG. 10 is a schematic cross-sectional view taken along a line B-B in FIG. 9.

Further, as illustrated in FIGS. 9 and 10, a radiator 45 is provided on the inner side of the front cowl 46 on the side surface of the front portion of the motorcycle 1. The radiator 45 is arranged substantially parallel to the vehicle longitudinal direction so as to face a mesh ventilation hole 46*m* provided on the side surface of the front cowl 46 with a fan 42 interposed therebetween. In the vehicle front potion, a pair of right and left front openings fh (see FIG. 3) are provided below the headlight HL. On both the right and left side surfaces of the front cowl 46, a raised portion 48*d* protruding outward in the vehicle width direction is formed on the front side of a leg FL of a rider. In the raised portion 48*d*, for example, two slits 48*s* capable of blowing air toward the rear of the raised portion 48*d* are formed side by side in the vertical direction.

Figure 11:
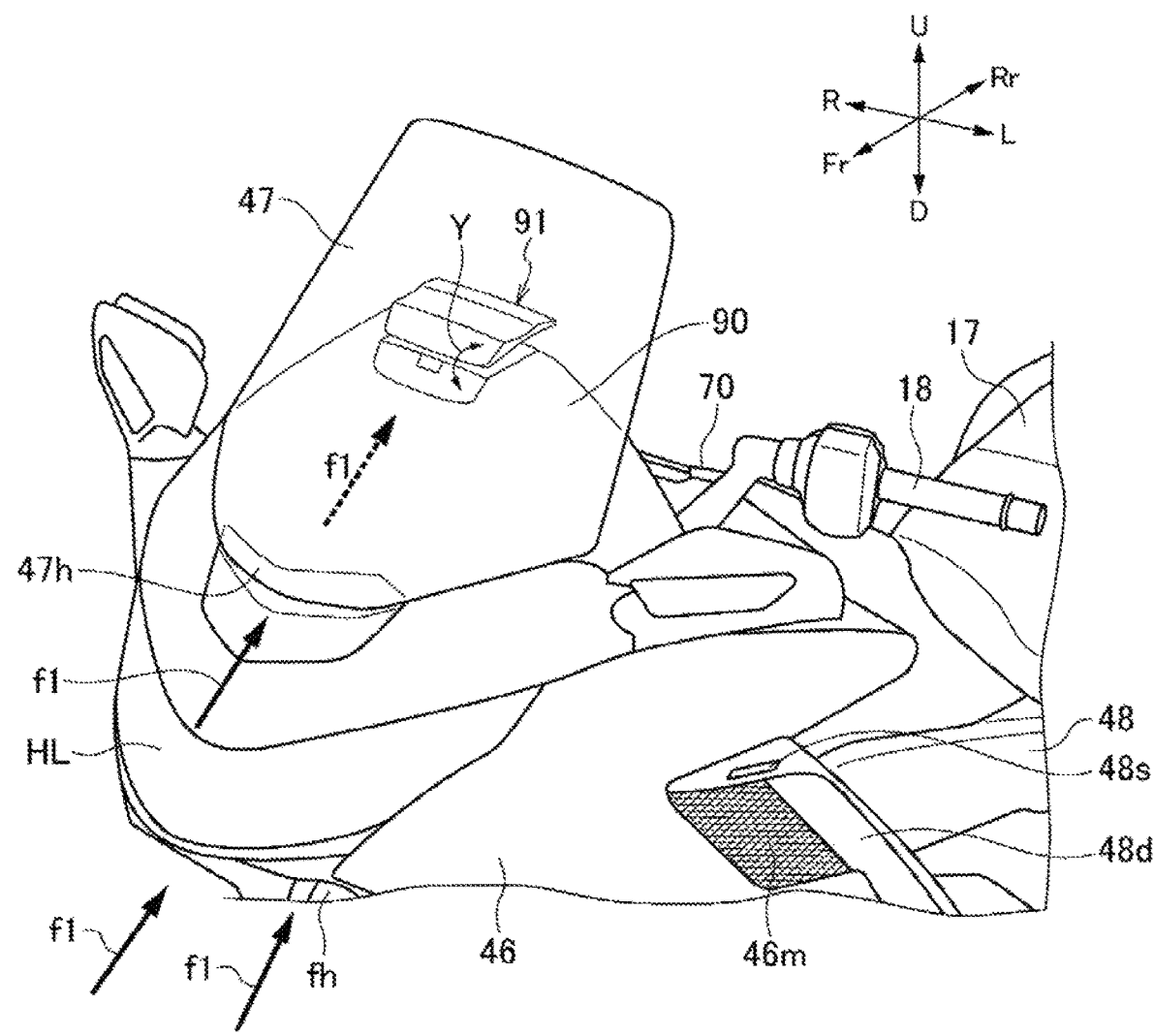
FIG. 11 is a perspective view of a front portion of the straddle vehicle illustrated in FIG. 1 as viewed from the upper left side.
Figure 12:
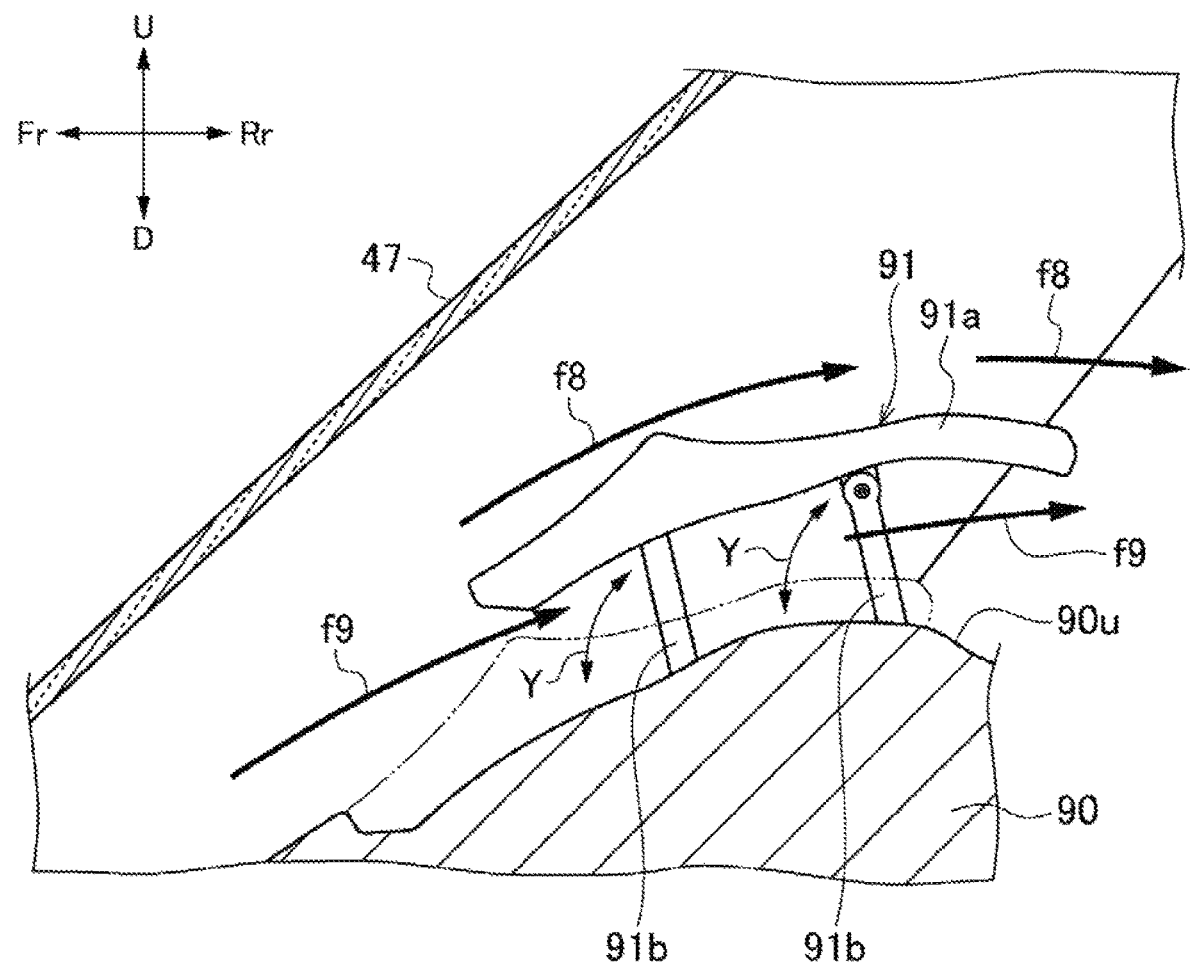
FIG. 12 is a schematic side view of a meter visor including a flap member as viewed from the left side.

Also, as illustrated in FIG. 11, a flap member 91 for straightening the air flow flowing on the meter visor 90 is provided in an upper end portion of the meter visor 90 in the front portion of the vehicle. As illustrated in FIG. 12, a straightening plate portion 91*a* has a streamline shape that conforms to the shape of an upper surface 90*u* of the meter visor 90 when seen from the side. The straightening plate portion 91*a* of the meter visor 90 is supported so as to be rotatable in the direction of an arrow Y so as to be spaced apart from the upper surface 90*u* of the meter visor 90 through four front, rear, left, and right link members 91*b* provided at the lower side. Therefore, the straightening plate portion 91*a* can be moved between a state of standing from the upper surface 90*u* of the meter visor 90, the state being indicated by the solid line in FIG. 12, and a state of being flush with the upper surface 90*u* where the straightening plate portion 91*a* is accommodated in the recessed portion of the upper surface 90*u*, the state being indicated by the two-dot chain line in FIG. 12.

When the air flow during travelling of the vehicle is described, as shown in FIGS. 9 and 10, a first air flow f1 flowing in from the front opening fh generates a third air flow f3 which passes through the radiator 45 and the fan 42 from the inside of the radiator 45 and flows to the outside and a fourth air flow f4 which passes through the inside of the front cowl 46 outside the radiator 45 and the fan 42, and then a fifth air flow f5 which passes through the mesh ventilation hole 46*m* and flows on the outside of the vehicle body and a sixth air flow f6 which passes through the slits 48*s*. The fifth air flow f5 flows so as to merge with a second air flow f2 flowing on the outside of the vehicle body. In this case, the sixth air flow f6 passing through the slits 48*s* reduces the negative pressure on the rear side of the raised portion 48*d*, and thus it is possible to prevent a seventh air flow 17 which is entrained in the direction side of the raised portion 48*d* and produces a vortex flow. Therefore, it is possible to prevent the air warmed through the radiator 45 from flowing to the leg FL side of a rider.

As illustrated in FIG. 12, when the vehicle travels, the flap member 91 can separate the first air flow f1 flowing in from a screen opening 47*h* (see FIGS. 1 and 11) provided at the forefront of the front screen 47 into an eighth air flow f8 which flows on the upper side of the straightening plate portion 91*a* of the flap member 91 and a ninth air flow f9 which flows on the lower side thereof. As a result, the air which flows behind the front screen 47 and to the rear side of the meter visor 90 can be effectively rectified.

As described above, in the embodiment, the side stand bracket 11 supporting the side stand 10 includes the first fixing portion 11*a* connected only to the lower portion 5*e* of the pivot frame 5 and the second fixing portion 11*b* connected only to the main step bracket 21 supporting the main step 20. Therefore, even in the structure where the main step bracket 21 and the side stand bracket 11 are fixed in an overlapped arrangement, the fastening points can be dispersed with respect to the pivot frame 5. As a result, it is possible to avoid an excessive rigidity increase in the lower portion 5*e* of the pivot frame 5 and make the rigidity balance of the body frame 2 appropriate.

The main step bracket 21 is arranged on the outer side in the vehicle width direction of the side stand bracket 11 and the main step bracket 21 is provided with the opening portion 22h through which the head portion 51a of the first fastening bolt 51 mounted on the first fixing portion 11a passes and is exposed to the outside, and thus only the side stand bracket 11 and the pivot frame 5 can be tightened by the first fastening bolt 51 for mounting the side stand bracket 11 without tightening the main step bracket 21. Therefore, the rigidity of the fastening portion is dispersed and the rigidity balance of the entirety of the body frame 2 can be made appropriate.

Further, since the opening portion 22h is formed in the main step bracket 21, the rigidity of the main step bracket 21 can be made appropriate. Therefore, the rigidity balance of the body frame 2 can be made appropriate.

Further, since the diameter of the second fastening bolts 61 and 62 mounted on the second fixing portions 11b are smaller than that of the first fastening bolt 51, a fastening force of the second fastening bolt 62 can be made smaller than a fastening force of the first fastening bolt 51. As a result, it is possible to make the rigidity balance of the entirety of the body frame 2 appropriate by dispersing the fastening portions.

In addition, since the main step bracket 21 is arranged so that at least a part thereof overlaps with the side stand bracket 11 when seen from the side, it is possible to make the side stand bracket 11 invisible from the side, and thus the appearance design is improved. Further, by covering the side stand bracket 11 of the forged product by the main step bracket 21 which is formed by casting and has a favorable design and a homogeneous painted surface, it is possible to improve the appearance design.

Further, since the rotation shaft 31 of the shift lever 30 overlaps with the main step bracket 21 when seen from the side so that the rotation shaft 31 is covered by the main step bracket 21, the shift lever 30 is inconspicuous. Therefore, it is possible to make it have a neat appearance around the shift lever 30, and thus the appearance design is improved.

Since the side stand bracket 11 includes the forward extension portion 11f which extends in the forward direction to be closer to the main step 20 from the side stand mounting portion 11d below the lower frame 6 and the pivot frame 5 and the second fixing portion 11b is provided in the forward extension portion 11f, the second fixing portion 11b can be arranged close to the main step 20. As a result, support of the main step 20 can be strengthened. Also, since the second fixing portion 11b provided in the forward extension portion 11f is arranged away from the lower frame 6 and the pivot frame 5, the tightening points to the body frame 2 are dispersed, and thus it is possible to provide a structure that facilitates the proper rigidity balance of the entirety of the body frame 2.

Since, in the lower portion 5e of the pivot frame 5, the recess portion 5d recessed inward in the vehicle width direction is formed and the first fixing portion 11a is provided in the recess portion 5d, it is possible to avoid a local increase in the rigidity around the first fixing portion 11a, and thus the rigidity balance of the entirety of the body frame 2 can be made appropriate.

Also, by attaching the side stand bracket 11 to the recess portion 5d of the pivot frame 5, it is possible to reduce the protrusion of the side stand bracket 11 to the outside of the pivot frame 5. Therefore, the main step bracket 21 mounted on the outer side of the side stand bracket 11 may have a shape that is smoothly connected to the pivot frame 5 by reducing the amount of protrusion in the vehicle width direction with respect to the outer surface of the pivot frame 5. As a result, the main step 20 can be narrowly arranged in the vehicle width direction and the vehicle body can be tilted more greatly at the time of vehicle rolling, and thus the rolling handling performance can be improved.

Since the lower portion 5e of the pivot frame 5 includes the frame fixing portion 53 connected only to the lower frame 6 in the vicinity of the side stand bracket 11, the pivot frame 5 and the lower frame 6 can be tightened without tightening both the side stand bracket 11 and the main step bracket 21 together to the frame fixing portion 53. As a result, it is possible to avoid an excessive rigidity increase in the lower portion 5e of the pivot frame 5 and make the rigidity balance of the body frame 2 appropriate.

Although the embodiment of the invention is described above, the invention is not limited thereto and can be changed as appropriate. For example, in the embodiment described above, the main step bracket 21 has a structure where the side stand mounting portion 11d on the lower side of the side stand bracket 11 is exposed when seen from the side. However, it may be a structure where the side stand mounting portion 11d is also covered.

Also, the shape of the side stand bracket 11 and the shape of the main step bracket 21 can be appropriately changed. Further, the number of fastening bolts is not limited to the above-described embodiment at all.

In the embodiment described above, a motorcycle is described. However, the invention can be applied to a straddle vehicle requiring a side stand regardless of the number of wheels.

Description of Reference Numerals and Characters

1: motorcycle (straddle vehicle)
2: body frame
3: head pipe
4: main frame
5: pivot frame
5d: recess portion
5e: lower portion
6: lower frame
7: seat frame
8: rear lower frame
10: side stand
11: side stand bracket
11a: first fixing portion
11b: second fixing portion
11d: side stand mounting portion
11f: forward extension portion
20: main step
21: main step bracket
22h: opening portion
30: shift lever
31: rotation shaft
51: first fastening bolt
51a: head portion
53: frame fixing portion
61, 62: second fastening bolt

The invention claimed is:

1. A straddle vehicle comprising:
a body frame including a main frame extending rear-downward from a head pipe, a pivot frame extending downward from the main frame, and a lower frame which extends downward from the head pipe and extends rearward, and further, is connected to a lower portion of the pivot frame;
a side stand which supports a vehicle body during parking;
a side stand bracket which supports the side stand;
a main step configured to support a foot of a rider; and
a main step bracket which supports the main step, wherein the main step bracket is arranged on an outer side in a vehicle width direction of the side stand bracket, the side stand bracket includes:
- a first fixing portion which has a first fixing hole and which is fixed to the pivot frame by screwing a first fastening bolt which passes through the first fixing hole to the lower portion of the pivot frame; and
- a second fixing portion which has a second fixing hole and which is fixed to the main step bracket by screwing a second fastening bolt to the second fixing hole, a head portion of the first fastening bolt passes through an opening portion of the main step bracket, the side stand bracket and the main step bracket are not fixed to each other by the first fastening bolt, the second fastening bolt is not screwed to the lower portion of the pivot frame, and the side stand bracket and the lower portion of the pivot frame are not fixed to each other by the second fastening bolt.

2. The straddle vehicle according to claim 1, wherein a diameter of the second fastening bolt mounted on the second fixing portion is smaller than that of the first fastening bolt.

3. The straddle vehicle according to claim 1, wherein the main step bracket is arranged so that at least a part of the main step bracket overlaps with the side stand bracket when seen from a side.

4. The straddle vehicle according to claim 1, wherein a shift lever for changing a gear ratio of a vehicle by an operation of the rider is supported in the lower frame, and a rotation shaft of the shift lever overlaps with the main step bracket when seen from a side.

5. The straddle vehicle according to claim 1, wherein the side stand bracket includes a forward extension portion which extends in a forward direction to be closer to the main step than a side stand mounting portion below the lower frame and the pivot frame, and the second fixing portion is provided in the forward extension portion.

6. The straddle vehicle according to claim 1, wherein a recess portion recessed inward in the vehicle width direction is formed in the lower portion of the pivot frame, and the first fixing portion is provided in the recess portion.

7. The straddle vehicle according to claim 1, wherein the lower portion of the pivot frame includes a frame fixing portion which is fixed to the lower frame in a vicinity of the side stand bracket, and which is not fixed to the side stand bracket and the main step bracket.

8. The straddle vehicle according to claim 6, wherein the side stand bracket is attached to the recess portion.

* * * * *